(12) United States Patent
Wagner

(10) Patent No.: US 12,492,929 B2
(45) Date of Patent: Dec. 9, 2025

(54) FLOW METER ASSEMBLY

(71) Applicant: Chart Inc., Ball Ground, GA (US)

(72) Inventor: Roland Wagner, Monheim (DE)

(73) Assignee: Chart Inc., Ball Ground, GA (US)

( * ) Notice: Subject to any disclaimer, the term of this patent is extended or adjusted under 35 U.S.C. 154(b) by 179 days.

(21) Appl. No.: 18/005,215

(22) PCT Filed: Jul. 21, 2021

(86) PCT No.: PCT/US2021/042492
§ 371 (c)(1),
(2) Date: Jan. 12, 2023

(87) PCT Pub. No.: WO2022/026261
PCT Pub. Date: Feb. 3, 2022

(65) Prior Publication Data
US 2023/0266154 A1    Aug. 24, 2023

Related U.S. Application Data

(60) Provisional application No. 63/056,886, filed on Jul. 27, 2020.

(51) Int. Cl.
  *G01F 1/74* (2006.01)
  *G01F 15/00* (2006.01)
  *G01F 15/02* (2006.01)

(52) U.S. Cl.
  CPC .............. *G01F 1/74* (2013.01); *G01F 15/005* (2013.01); *G01F 15/022* (2013.01)

(58) Field of Classification Search
  CPC ......... G01F 1/74; G01F 15/005; G01F 15/022

USPC ........................................................ 73/861.08
See application file for complete search history.

(56) References Cited

U.S. PATENT DOCUMENTS

| | | | | |
|---|---|---|---|---|
| 4,574,643 A | * | 3/1986 | Scott | .......................... G01F 1/74 |
| | | | | 327/104 |
| 6,912,858 B2 | * | 7/2005 | White | ................... F17C 13/021 |
| | | | | 62/50.5 |
| 7,054,764 B2 | * | 5/2006 | Williams | ................... G01F 1/74 |
| | | | | 702/45 |
| 2014/0238124 A1 | | 8/2014 | Dallais et al. | |

FOREIGN PATENT DOCUMENTS

WO      2017166367 A1    10/2017

OTHER PUBLICATIONS

International Search Report and Written Opinion for PCT/US2021/042492 Dated Oct. 27, 2021.

* cited by examiner

*Primary Examiner* — Peter J Macchiarolo
*Assistant Examiner* — Rodney T Frank
(74) *Attorney, Agent, or Firm* — Cook Alex Ltd.

(57) ABSTRACT

A flow meter assembly for a dispensing line includes a differential pressure transmitter, a pressure transmitter, a temperature transmitter and a controller in communication with each transmitter. The controller is configured to use data collected from the transmitters to determine if there is subcooling or two-phase flow of a fluid flowing through the dispensing line and to meter fluid flowing through the dispensing line if there is subcooling or no two-phase flow.

14 Claims, 4 Drawing Sheets

FLOW METER ASSEMBLY

CLAIM OF PRIORITY

This application is the U.S. National Stage of PCT International Patent Application No. PCT/US21/42492, filed Jul. 21, 2021, which claims the benefit of U.S. Provisional Application No. 63/056,886, filed Jul. 27, 2020, the contents of which are hereby incorporated by reference.

FIELD OF THE DISCLOSURE

The present disclosure relates generally to flow meter assemblies and, in particular, to flow meter assemblies with two-phase flow detection for use in cryogenic fluid dispensing systems.

BACKGROUND

Cryogenic fluids, that is, fluids having a boiling point generally below −150° C. at atmospheric pressure, are used in a variety of applications, such as mobile and industrial applications. Dispensing of the cryogenic fluids, such as liquefied natural gas (LNG), nitrogen, argon, oxygen, hydrogen, helium, can be a complicated process that requires extensive monitoring.

One important consideration in dispensing of cryogenic liquid is the accuracy of the amount dispensed. For accurate flow measurement of liquids, it is important to ensure that the product remains in the liquid state while flowing through the meter. Gas, which has a much lower density than liquid, can cause significant metering errors due to displacement of liquid, which results in over registering. Two-phase flow (gas & liquid) normally occurs when the supply tank is running out of liquid or the line pressure falls below the saturation pressure of the product.

There are several different approaches to the two-phase flow problem currently being used. For example, current dispensing systems may utilize a phase separator upstream of the flow meter in conjunction with a differential valve. However, phase separators are large and heavy. Two-phase flow may also be detected using optical sensors for measurement of the vapor content in the liquid. Optical sensors are expensive and require calibration. Both solutions cause unneeded complication and expense to a cryogenic fluid dispensing system.

SUMMARY

The example embodiments disclosed herein provide an advantageous flow meter assembly for cryogenic liquid dispensing systems that overcome disadvantages of the prior art flow meter assemblies. The disclosed flow meter assembly is able to better manage and detect two-phase flow and prevent inaccurate dispensing.

In one aspect, a flow meter assembly attached to a portion of a dispensing line includes a differential pressure transmitter, a pressure transmitter, a temperature transmitter, and a controller in communication with each transmitter. The controller is configured to use data collected from the transmitters to determine if there is subcooling or two-phase flow of a fluid flowing through the dispensing line and to meter fluid flowing through the dispensing line if there is subcooling or no two-phase flow.

In a further aspect, a cryogenic fluid dispensing system includes a tank defining an area that holds cryogenic liquid, a dispensing line in liquid communication with the tank and configured to direct cryogenic liquid from the tank to a use device and a dispensing valve associated with the dispensing line. A flow meter assembly includes a differential pressure transmitter, a temperature transmitter, a pressure transmitter and a controller in communication with the transmitters and dispensing valve. The controller is configured to use data collected from the transmitters to determine if there is two-phase flow or subcooling of a fluid flowing through the dispensing line.

In still a further aspect, a method of monitoring flow in a cryogenic fluid dispensing system includes the steps of storing cryogenic fluid in a tank, directing cryogenic fluid so that it flows through a dispensing line to a use device, monitoring a temperature and a discharge pressure of the cryogenic fluid flowing in the dispensing line, determining a saturation pressure of the cryogenic fluid flowing in the dispensing line using the monitored temperature, comparing the discharge pressure to the saturation pressure, metering the cryogenic fluid flowing in the dispensing line as long as the discharge pressure is a predetermined level above the saturation pressure and terminating metering of the cryogenic fluid flowing in the dispensing line when the discharge pressure is less than the predetermined level above the saturation pressure.

In an additional aspect, a flow meter assembly attached to a portion of a dispensing line includes a flow meter, a pressure transmitter, a temperature transmitter, and a controller in communication with each transmitter and the flow meter. The controller is configured to use data collected from the transmitters to determine if there is subcooling or two-phase flow of a fluid flowing through the dispensing line and data collected from the flow meter to meter fluid flowing through the dispensing line if there is subcooling or no two-phase flow.

It is to be understood that both the foregoing general description and the following detailed description are exemplary and provided for the purposes of explanation only and are not restrictive of the subject matter claimed. Further features and objects of the present disclosure will become more fully apparent in the following description of the preferred embodiments and from the appended claims.

BRIEF DESCRIPTION OF THE DRAWINGS

In describing the preferred example embodiments, references are made to the accompanying drawing figures wherein like parts have like reference numerals, and wherein.

It should be understood that the drawings are not to scale. While some mechanical details of example dispensing systems and of alternative configurations have not been included, such details are considered well within the comprehension of those of skill in the art in light of the present disclosure. It also should be understood that the present disclosure is not limited to the example embodiments shown.

DETAILED DESCRIPTION OF EMBODIMENTS

Cryogenic fluids, due to unique storage conditions, are extremely susceptible to temperature fluctuations when a cryogenic fluid is flowing through a storage or dispensing system. It is, therefore, useful to monitor and adjust for changes in temperature and pressure when metering while dispensing to a use device. The disclosed embodiments include flow meter assemblies, systems, and processes designed to monitor metering and check for two-phase flow. While the embodiments are described as cryogenic fluid dispensing systems, the technology of the disclosure may be applied to alternative types of dispensing systems containing alternative types of fluids.

As described below, when dispensing of the cryogenic fluid is demanded in an embodiment of the system disclosed, the cryogenic fluid may be pumped through a pump, or otherwise driven, into the dispensing line to the use device. The cryogenic fluid passes through the flow meter assembly before being distributed through a product line to a use device. During the dispensing, the flow meter assembly is used to measure properties of the fluid flowing through the dispensing line. If the properties of the fluid indicate two-phase flow or a possibility of two-phase flow, the flow meter assembly can prevent further dispensing.

Figure 1:
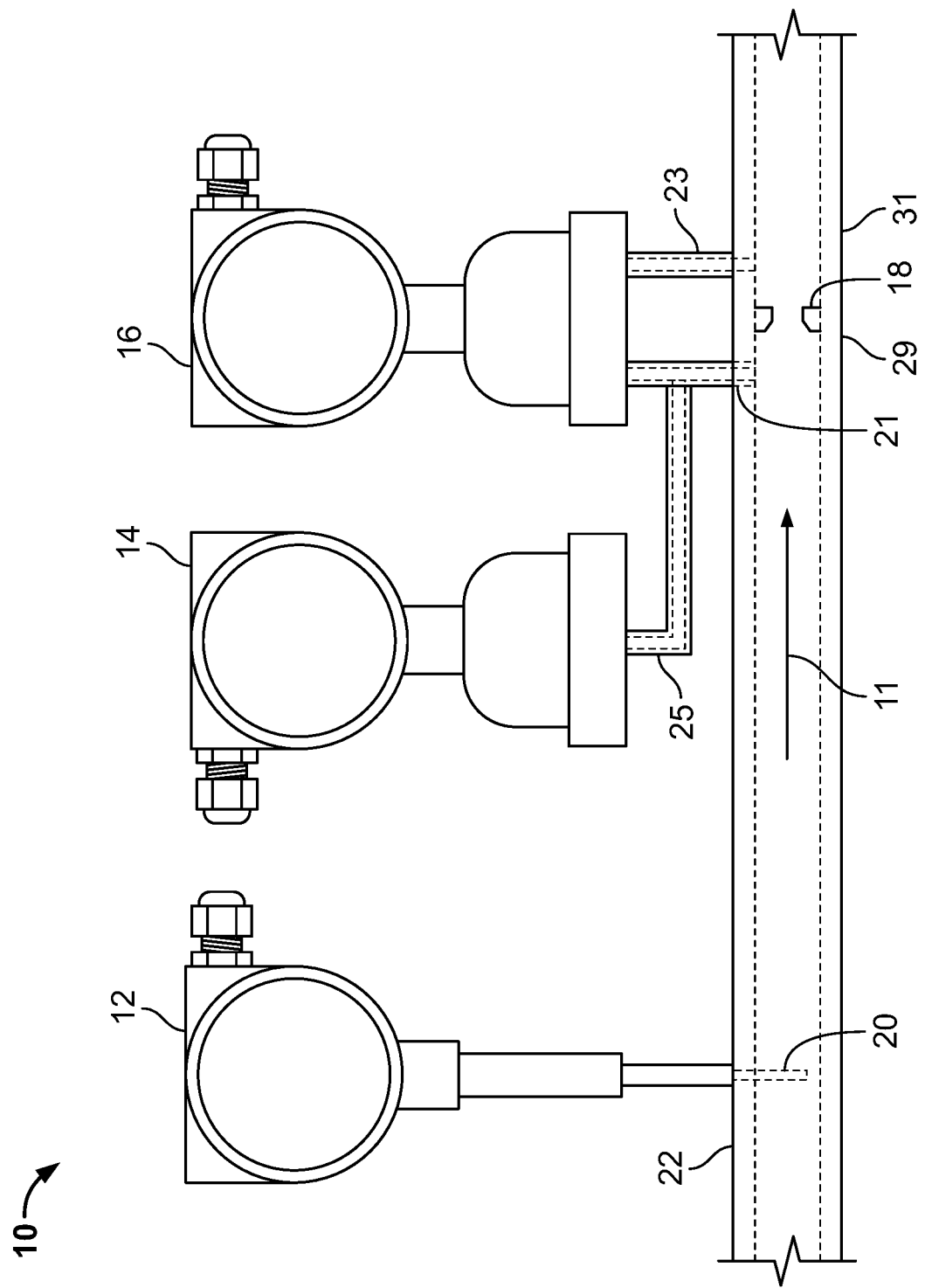
FIG. 1 is a schematic view of a flow meter assembly of a cryogenic fluid dispensing system in accordance with the disclosure.
Figure 2:
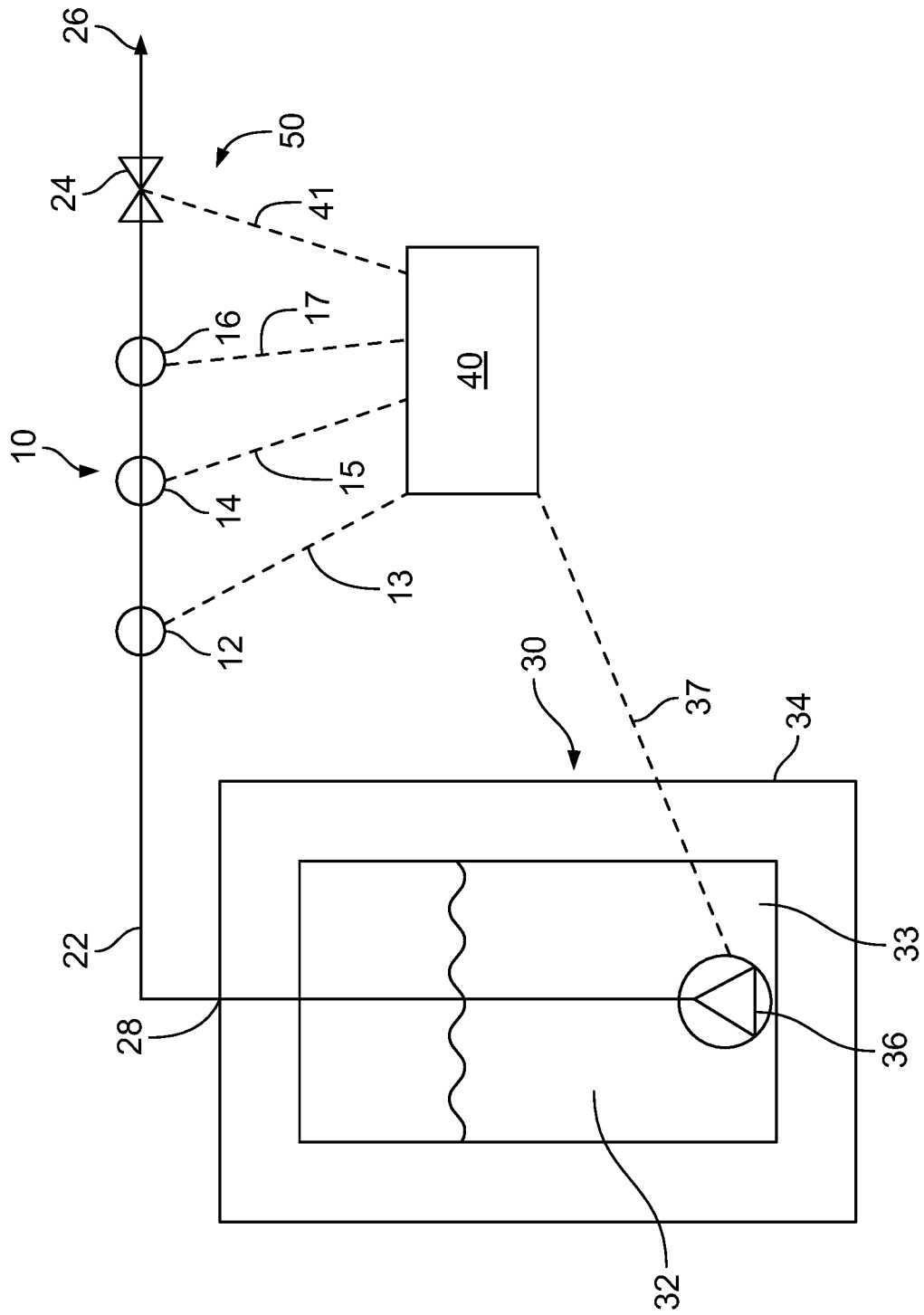
FIG. 2 is a schematic view of a cryogenic fluid dispensing system including the flow meter assembly of FIG. 1 in accordance with the disclosure.

A first embodiment of a flow meter assembly configured in accordance with the disclosure is indicated in general at 10 in FIG. 1 and shown schematically as part of a cryogenic liquid dispensing system (FIG. 2). The flow meter assembly is placed along a dispensing line 22 of a cryogenic liquid dispensing system (FIG. 2) for metering and measuring the properties of a fluid travelling in the direction of the arrow 11 of FIG. 1. The flow meter assembly includes a temperature transmitter 12, a pressure transmitter 14 and a differential pressure transmitter 16. The transmitters are in communication with a controller 40 (FIG. 2). The pressure transmitters are placed downstream from the temperature transmitter 12 in FIG. 1, but may be otherwise oriented along the length of the dispensing line 22.

The temperature transmitter 12 includes a temperature sensor 20, placed within the dispensing line 22 to measure the temperature of the fluid passing through the dispensing line 22. The temperature transmitter and sensor may be any known in the art for attaching to a pipe and reading the temperature of the fluid within the pipe.

The pressure transmitter 14 and differential pressure transmitter 16 are placed in combination along the dispensing line. The differential pressure transmitter 16 includes an orifice 18, placed within the dispensing line pipe 22. Although an orifice is utilized in the disclosed embodiment, any restrictive element may be placed inside the pipe coordinating with the differential pressure transmitter 16. An inlet portion 29 of the dispensing line 22 is located upstream from the orifice 18 or other restrictive element. An outlet portion 31 of the dispensing line 22 is located downstream from the orifice 18 or other restrictive element. The differential pressure transmitter 16 includes an inlet pressure sensor or tap 21 and an outlet pressure sensor or tap 23. The pressure transmitter 14 also includes a pressure sensor or tap 25 connected to the inlet pressure sensor or tap 21 of the differential pressure transmitter 16.

The flow meter assembly 10 constantly measures temperature and discharge pressure of the liquid using the temperature transmitter 12 and the pressure transmitter 14. The differential pressure transmitter 16 monitors flow rate of the fluid through the flow meter assembly. Alternatively, a turbine flow meter or other type of flow meter may be substituted for the differential pressure transmitter, and the orifice 18 or other restrictive element, in the cryogenic fluid dispensing system for monitoring flow rate of the fluid through the flow meter assembly.

A first embodiment of a cryogenic fluid dispensing system including the flow meter assembly 10 configured in accordance with the disclosure is indicated in general at 50 in FIG. 2. The cryogenic liquid dispensing system 50 includes a tank, indicated in general at 30, defining an area that holds cryogenic liquid 32. The cryogenic liquid 32 can be at least one of nitrogen, helium, neon, argon, krypton, hydrogen, liquefied natural gas and oxygen, although other types of fluids are within the scope of this disclosure. Other non-cryogenic liquids, including, but not limited to, carbon dioxide and nitrous oxide, are also within the scope of this disclosure. The tank 30 preferably includes a double-wall construction including inner vessel 33 and outer jacket 34 with insulation therebetween. The tank 30 also includes a refilling port (not shown).

The tank of the cryogenic fluid dispensing system can be configured horizontally or vertically. In one embodiment there is a separate fill pipe and a separate withdrawal pipe, but the two pipes may optionally be combined. There may be other paths out of the inner vessel to fill and remove the liquid as well. The fill and withdrawal pipes may be any suitable conduit for conveying or allowing the flow of fluid therethrough.

A dispensing conduit or line 22 is in liquid communication with the tank at a first end 28 and a use device (when connected) at the second end 26. The second end 26 may include a connector compatible with a use device or system and a valve to control dispensing. The dispensing line 22 may be connected to a pump 36 within cryogenic liquid 32 of tank 30. When the pump 36 is activated, liquid 32 is pumped through dispensing line 22. Alternatively, the pump 36 may be positioned in a sump that receives liquid from the tank 30, along the dispensing line 22 or omitted from the cryogenic liquid dispensing system 50 with the dispensing line 22 connecting to the bottom portion of the tank 30 so that gravity drives fluid flow from the tank.

The dispensing line 22 includes at least one dispensing valve 24. The dispensing valve 24 may be located downstream from the flow meter assembly, as illustrated.

The valve 24 or valves of the dispensing line may be automated to function to start and stop the flow of liquid when desired.

The flow meter assembly 10, including temperature transmitter 12, pressure transmitter 14 and differential pressure transmitter 16, is placed along dispensing line 22.

The controller 40 can be a microcontroller or any other computer device. The controller 40 is in communication, as shown by dashed lines 13, 15, and 17, with each transmitter. The controller can also be in communication with dispensing valve 24 and pump 36, indicated by dashed lines 41 and 37. Controller can be wired or wirelessly connected to each transmitter, pump 36 and dispensing valve 24.

The controller 40 may store specific product data, including saturation pressure at different temperatures, in a look-up table. Alternatively, or in addition, the controller 40 may be programmed with polynomials for use in calculating saturation pressure, given a fluid temperature. As an example, for Nitrogen between 77.15° K and 116.15° K, the equation is:

$$pSat[bara]f(T[K])=-3.95243918E+01+T^*\\(1.69490866E+00+T^*(-2.51080792E-02+\\T^*1.28893065E-04))$$

As another example, for Propane between 248° K and 323° K, the equation is:

$$pSat[bara]=f(T[K])-7.69296217E+01+T^*\\(1.05951461E+00+T^*(-5.00337031E-03+\\T^*8.12429991E-06))$$

Using these tables and/or equations, the controller 40 can determine the saturation pressure of the fluid flowing in line 22 using the temperature detected by temperature transmitter 12. The controller 40 also monitors the discharge pressure using pressure transmitter 14 to check that the discharge pressure is greater than the determined saturation pressure by applying a suitable safety margin, such as 1 bar, and thereby ensuring sufficient subcool of the liquid stream in line 22.

If the discharge pressure drops and/or the temperature rises so that the minimum subcool requirement is no longer met, the controller 40 will either stop totalizing or terminate the delivery by stopping pump 36 and/or closing dispensing valve 24 downstream of the flow meter assembly 10. The flow meter assembly 10 therefore ensures that while it is metering, the liquid in the meter does not contain any vapor. In an alternative embodiment, the dispensing valve 24 may be a three-way valve including a setting whereby fluid, after flowing through the flow meter assembly 10, may be directed back to the tank 30 as pump 36 continues to run when the minimum subcool requirement is no longer met.

The controller 40 may also perform density compensation during metering by using temperature or temperature and pressure data from transmitters 12 and 14. The controller 40 may be provided with a density look-up table and/or equations for use in calculating fluid density given the temperature or temperature and pressure of the fluid in line 22 from temperature transmitter 12 and pressure transmitter 14. If temperature and pressure are used, the system takes into account compressibility and provides enhanced system accuracy while utilizing the same pressure transmitter as the meter. The controller 40 takes the flow rate recorded by the differential pressure transmitter 16 and, using the determined fluid density, can accurately totalize the amount of liquid dispensed.

The dispensing system 50 may also include a conditioning system to adjust the temperature of the cryogenic fluid before dispensing. The conditioning system may include a conditioning heat exchanger for cooling or heating cryogenic liquid as it is dispensed. The conditioning system may be on the dispensing line 22 before or after the flow meter assembly 10. In one embodiment, the flow meter assembly 10 is upstream from the conditioning system and the transmitter readings are utilized to assess whether the fluid is at the correct temperature and pressure for distribution or needs to pass through the conditioning system.

Figure 3:
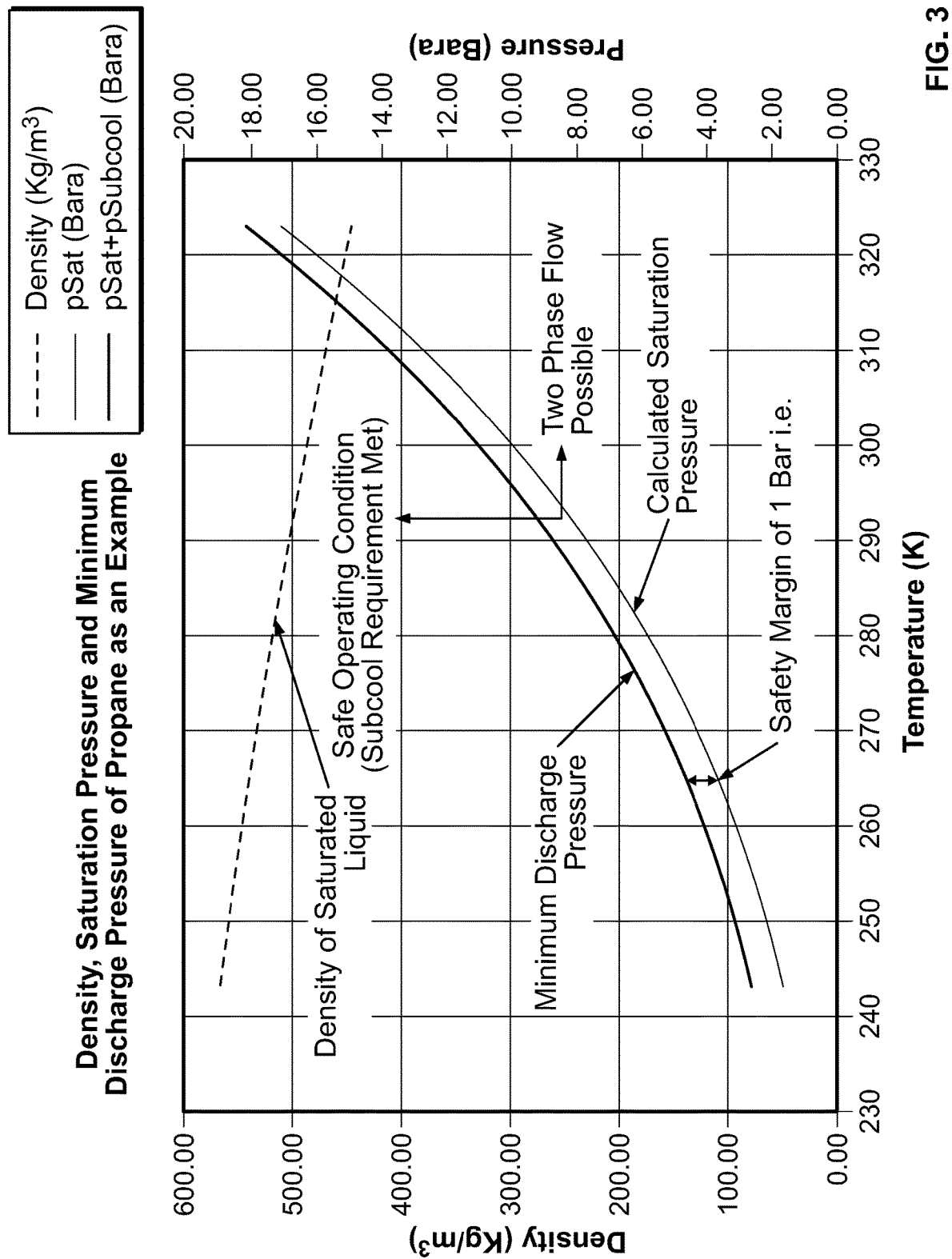
FIG. 3 is a chart of density, saturation pressure and minimum discharge pressure of propane as an example of monitoring fluid through a flow meter assembly in accordance with the disclosure.
Figure 4:
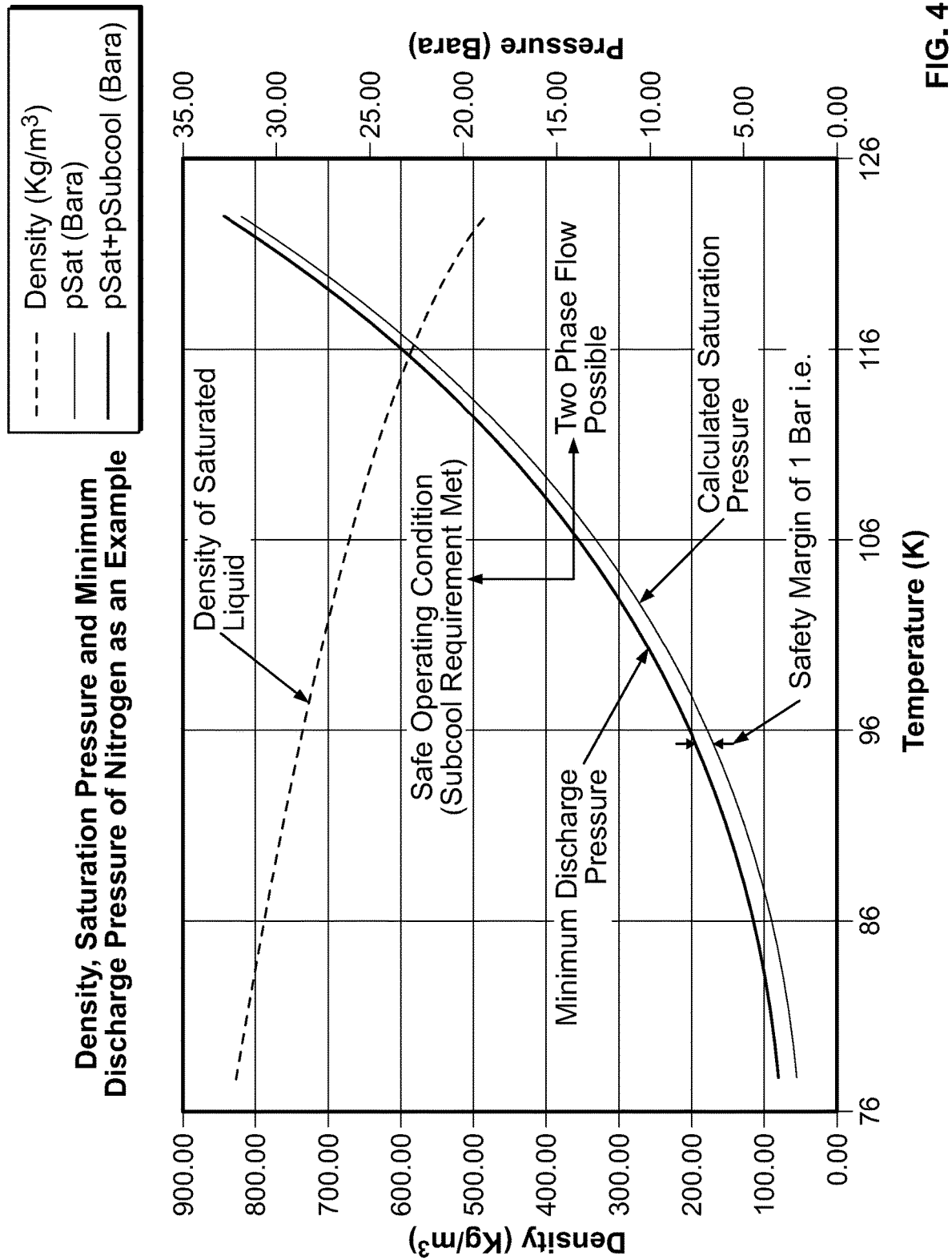
FIG. 4 is a chart of density, saturation pressure and minimum discharge pressure of nitrogen as an example of monitoring fluid through a flow meter assembly in accordance with the disclosure.

FIGS. 3 and 4 each illustrate a graph of inputs and calculated data used by the controller 40 to monitor and prevent two-phase flow during metering. The saturation pressure is calculated based on the type of liquid (propane and nitrogen are used in the charted examples) and temperature. The minimum discharge pressure, about 1 bar above the saturation pressure (as an example only), ensures that the fluid will not have two-phase flow, as long as the pressure is maintained above that curve. Any pressure below the calculated saturation pressure could trigger a two-phase flow. As described above, the density is also utilized by the controller to provide density compensation during metering.

While the preferred embodiments of the disclosure have been shown and described, it will be apparent to those skilled in the art that changes and modifications may be made therein without departing from the spirit of the disclosure, the scope of which is defined by the following claims.

What is claimed is:

1. A flow meter assembly for a dispensing line comprising:
   a differential pressure transmitter;
   a pressure transmitter;
   a temperature transmitter; and
   a controller in communication with the differential pressure transmitter, the pressure transmitter and the temperature transmitter;
   wherein the controller is configured to compare a discharge pressure from the pressure transmitter to a saturation pressure determined using a temperature from the temperature transmitter to determine if there is two-phase flow or subcooling of a fluid flowing through the dispensing line and to meter fluid flowing through the dispensing line if there is subcooling or no two-phase flow.

2. The flow meter assembly of claim 1, wherein the data collected includes discharge pressure data from the pressure transmitter.

3. The flow meter assembly of claim 1, wherein the data collected includes temperature data collected from the temperature transmitter.

4. The flow meter assembly of claim 1, wherein the differential pressure transmitter includes a restricting element.

5. The flow meter assembly of claim 4, wherein the restricting element is an orifice.

6. The flow meter assembly of claim 4, wherein the differential pressure transmitter includes a first pressure sensor tap located on the dispensing line upstream from the restricting element.

7. The flow meter assembly of claim 4, wherein the differential pressure transmitter includes a second pressure sensor tap located on the dispensing line downstream from the restricting element.

8. The flow meter assembly of claim 6, wherein the pressure transmitter is connected to the first pressure sensor tap of the differential pressure transmitter.

9. The flow meter assembly of claim 1, wherein the controller is configured to determine a density of a cryogenic fluid flowing through the dispensing line using a temperature from the temperature transmitter or a temperature from the temperature transmitter and a discharge pressure from the pressure transmitter.

10. A method of monitoring flow in a cryogenic fluid dispensing system comprising the steps of:
   a. storing cryogenic fluid in a tank;
   b. directing cryogenic fluid so that it flows through a dispensing line to a use device;
   c. monitoring a temperature and a discharge pressure of the cryogenic fluid flowing in the dispensing line;
   d. determining a saturation pressure of the cryogenic fluid flowing in the dispensing line using the monitored temperature;
   e. comparing the discharge pressure to the saturation pressure;

f. metering the cryogenic fluid flowing in the dispensing line as long as the discharge pressure is a predetermined level above the saturation pressure;

g. terminating metering of the cryogenic fluid flowing in the dispensing line when the discharge pressure is less than the predetermined level above the saturation pressure.

11. The method of claim 10, further comprising the step of closing a dispensing valve in the dispensing line if the discharge pressure is less than the predetermined level above the saturation pressure.

12. The method of claim 10, further comprising the steps of determining a differential pressure of the cryogenic fluid flowing in the dispensing line and using the differential pressure to calculate a flow rate that is used in metering the cryogenic fluid flowing in the dispensing line.

13. The method of claim 12, further comprising the step of using the monitored temperature to determine a density of the cryogenic fluid flowing in the dispensing line and using the density in metering the cryogenic fluid flowing in the dispensing line.

14. The method of claim 12, further comprising the step of using the monitored temperature and the discharge pressure to determine a density of the cryogenic fluid flowing in the dispensing line and using the density in metering the cryogenic fluid flowing in the dispensing line.

* * * * *